Dec. 9, 1969   E. M. TRAMMELL, JR   3,482,561
INTERNAL COMBUSTION ENGINE
Filed June 3, 1968

Inventor
EARL M. TRAMMELL, JR.
By Cohn and Powell
Attorneys

United States Patent Office 3,482,561
Patented Dec. 9, 1969

3,482,561
INTERNAL COMBUSTION ENGINE
Earl M. Trammell, Jr., Ladue, Mo.
(%EMT Enterprises, Box 435, St. Louis, Mo. 63166)
Continuation-in-part of application Ser. No. 564,195, July 11, 1966. This application June 3, 1968, Ser. No. 734,162
Int. Cl. F16h 21/40, 21/16, 21/18
U.S. Cl. 123—197                                     7 Claims

ABSTRACT OF THE DISCLOSURE

A crankshaft assembly in an internal combustion engine that permits a substantial reduction in conventional connecting rod lengths for piston-operating engines. The assembly is particularly adapted for a single cylinder engine, and has a connector bearing integral with a crankarm bearing. The connector bearing is oscillatively mounted and connected to the piston, and the crankarm bearing is oscillatively mounted to a crankarm, the center axes of the connector bearing and crankarm bearing being eccentric. The distance between the center axes of the connector bearing and crankarm bearing determines the length of a comparable effective, conventional, connecting rod. The distance between the center axes of the connector bearing and crankarm bearing is greater than the distance between the center axes of the crankarm bearing and the crankshaft. Furthermore, the center axis of the connector bearing is located between the center axis of the crankarm bearing and the top of the piston at all times during rotation of the crankshaft.

BACKGROUND OF THE INVENTION

This application is a continuation-in-part of copending U.S. application 564,195, filed July 11, 1966, now U.S. Patent No. 3,386,429, issued June 4, 1968. The crankshaft assembly has been especially designed for and is more practically adapted to one cylinder engines.

This invention relates generally to improvements in an internal combustion engine, and more particularly, to an improved crankshaft design that permits substantial reduction in conventional connecting rod lengths for piston-operating engines.

In present conventional one-cylinder engines with approximately 2¾ inch bores and with 2½ inch strokes, the connecting rods average about 4 or more inches. Maximum accelerated piston travel for engines of these specifications occur near 75° after DTC. Also 100% of the piston thrust is not transmitted into torque until near 75° after DTC.

The crankshaft assembly in copending U.S. Patent No. 3,386,429 permits maximum reduction in connecting rod length so as to gain greater torque and engine efficiency. However, the circular connector bearing needs to be of relatively large size and requires a large diameter piston or an oblong piston for its practical application. While this early structure can be utilized in a one cylinder engine, the structure in the present invention permits a considerable reduction in the circular connector bearing and thus will probably prove more practical for one cylinder engines.

SUMMARY OF THE INVENTION

There are two distinct and important advantages attained by the present improved crankshaft mechanism that effects a short connecting rod, namely: (1) the torque is increased, and (2) the piston speed is increased during maximum pressures of the power stroke. It is obviously advantageous to boost the engine torque without increasing the bore area or the length of stroke. Equally advantageous, especially for high compression engines, is to have the piston travel or speed at its maximum during maximum pressures of the power stroke because there is a more efficient transmittal of thermal energy into mechanical energy or power. Very important also, is that this condition permits the use of higher compression ratios.

The subject crankshaft mechanism will more efficiently utilize the piston pressure. Also it can be shown, strokes being equal, that the new crankshaft mechanism will provide from 40% or more faster piston speed and from 40% or more torque from about 1° to 50° of the power stroke than that of the present engines.

This internal combustion engine has a cylinder in which a piston is reciprocatively mounted, and a circular connecting bearing integral with the crankarm bearing. The connector bearing is oscillatively connected and mounted to the piston, and the crankarm bearing is oscillatively mounted to a crankarm. The center axes of the connector bearing and the crankarm bearing are eccentric. The distance between the center axes of the connector bearing and the crankarm bearing determines the length of a comparable effective connecting rod.

The means operatively mounting the connector bearing for oscillative movement and operatively connecting the connector bearing to the piston includes a track internally of the piston in which the connector bearing is slidably journalled.

The distance between the center axes of the connector bearing and the crankarm bearing is greater than the radius of the crankarm.

This internal combustion engine incorporates a crankshaft mechanism that is simple and durable in construction, economical to manufacture and assemble, and highly efficient in operation.

The present connector bearing is made integral with the crankarm bearing that has been designed to oscillate in the spaced arms of the crankarm. This structure permits considerable reduction in the circular size of the connector bearing and thereby eliminates the need for a large diameter piston or the need to use an oblong piston.

The unitary connector bearing-crankarm bearing combination piece eliminates the heretofore conventional fixed horizontal crankarm bearing, which, if used in the present engine design, would require the entire sides of the piston and cylinder walls to be cut away for rotational clearance. However, by using the present unitary piece, sufficient area on the piston and cylinder walls can be retained for practical operation and travel of the piston.

DESCRIPTION OF THE PREFERRED EMBODIMENT

Figure 1:
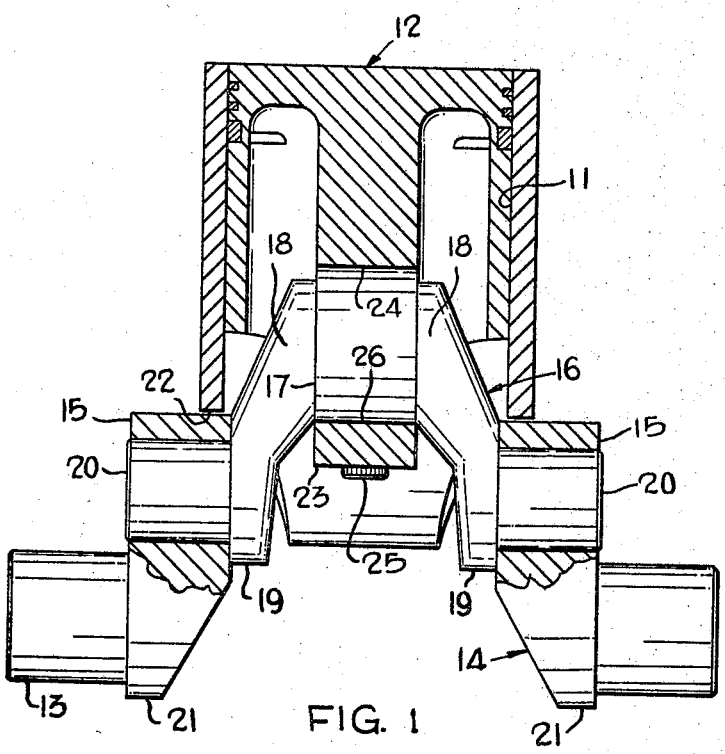
FIG. 1 is a vertical section through an internal combustion engine taken through the cylinder, the piston being illustrated at DTC (dead top center)

Referring now by characters of reference to the drawing, and first to FIG. 1, it will be understood that the internal combustion engine includes a block (not shown) having a cylinder 11 of substantially circular cross section. The top of the cylinder 11 is closed by a head carrying the valves and sparkplug. The head is shaped to form the combustion chamber, all as is shown in copending U.S. Patent No. 3,386,429. Reciprocatively mounted within the cylinder 11 is a compatible piston 12. The piston 12 has a substantially circular configuration that closely matches the circular shape of cylinder 11.

Extending longitudinally in the engine block is a rotatively mounted crankshaft 13, the center axis of which is designated by the reference character C. The crankshaft 13 provides a crankarm referred to by 14 consisting of a pair of spaced arms 15, and a crankarm bearing referred to by 16. The center axis of the crankarm bearing 16 is designated by reference character B.

Integral with the crankarm bearing 16 is a circular connector bearing 17. The center axis of the connector bearing 17 is designated by the reference character A. The center axis A of the connector bearing 17 and the center axis B of the crankarm bearing 16 are eccentric. The distance between the center axis A of the connector bearing 17 and the center axis B of the crankarm bearing 16 represents the length of a comparable connecting rod in the heretofore conventional crankshaft mechanism. The distance between the center axis B of the crankarm bearing 16 and the center axis C of the crankshaft 13 represents the crankarm radius. For reasons which will later appear, it is important that the distance between the center axes A and B is greater than the distance between the center axes B and C.

The crankarm bearing 16 includes extension portions 18 extending from opposite sides of the connector bearing 17 and extending in the same generally radial direction from the center axis A to provide a space between the extension portions 18 and includes relatively outwardly facing bearing portions 20 on ends 19 of the extension portions 18, the bearing portions 20 being oscillatively mounted in and to the spaced arms 15 of the crankarm 14.

Of course, as is conventional, suitable counterweights (not shown) are attached to the crankshaft 13 in the general region indicated by 21.

The cylinder 11 is cut away or recessed at opposite sides 22 to provide clearance for and to receive the arms 15 of the crankarm 14. The arms 15 are spaced apart approximately the diameter of the cylinder 11.

The piston 12 is open at the bottom and is provided with an internal, substantially semicircular track 24 on which the circular connector bearing 17 slidably seats. A transverse strap 23 is attached to the piston 12 by a pair of cap screws 25. This strap 23 provides an internal, substantially semicircular track 26 that complements the arcuate track 24 formed in the piston 12, the arcuate track 26 also slidably engaging the periphery of the connector bearing 17.

The tracks 24 and 26 constitute means operatively mounting the connector bearing 17 for oscillative movement, and operatively connecting the connector bearing 17 to the piston 12.

Figure 3:
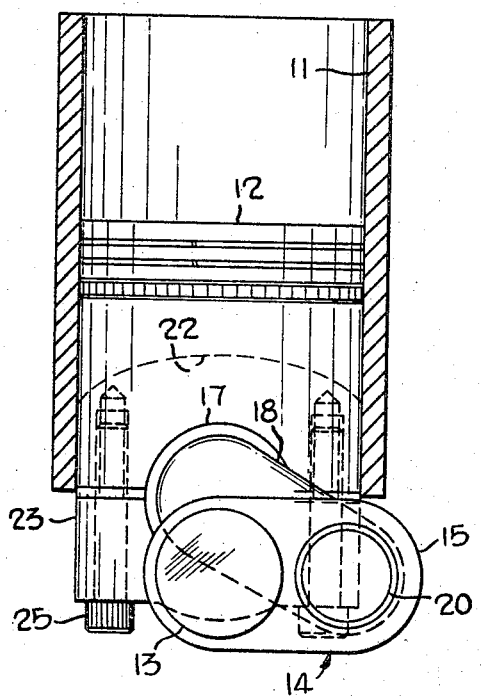
FIG. 3 is a vertical section similar to FIG. 2, but illustrating the crankarm at approximately 90° past DTC.
Figure 2:
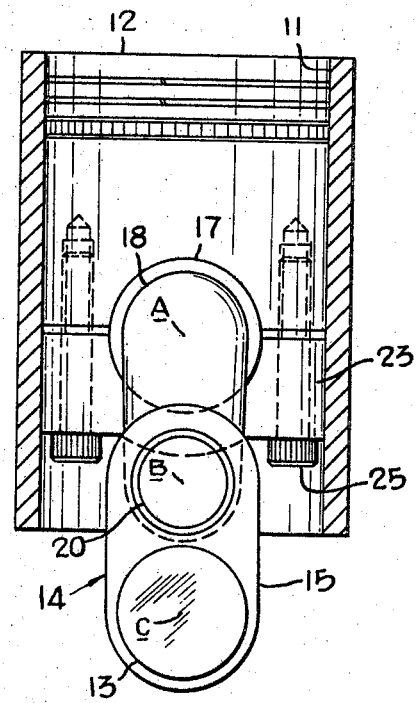
FIG. 2 is a cross sectional view at right angle to FIG. 1.

As the piston 12 moves downwardly in the cylinder 11, the slidable engagement of the connector bearing 17 with the arcuate tracks 24 and 26 constrains the connector bearing 17 to a straight vertical path. Consequently, as the crankarm 14 rotates in a clockwise direction (FIGS. 2 and 3) the crankarm bearing portions 20 will turn in the arms 15 of the crankarm 14, and the connector bearing 17 will turn freely in a counterclockwise direction on the tracks 24 and 26 internally of piston 12. Upon continued downward movement of the piston 12, the crankshaft 13 will rotate and the crankarm bearing portions 20 will move to 180° past DTC, at which point the connector bearing 17 will have turned in a clockwise direction within the tracks 24 and 26 back to the initial position shown in FIG. 2.

As the piston 12 moves upwardly within the cylinder 11, the crankshaft 13 will continue to move in a clockwise direction, thereby causing the crankarm bearing portions 20 to turn in the arms 15 of the crankarm 14, and the connector bearing 17 to turn in a clockwise direction on the tracks 24 and 26 internally of the piston 12. Upon continued rotation of the crankshaft 13, as the crankarm bearing 16 approaches the DTC position shown in FIG. 1, the connector bearing 17 will reverse and turn in a counterclockwise direction on the tracks 24 and 26 back to its initial position shown in FIG. 2.

It will be understood that the crankarm bearing 16 will oscillate between limits on the crankarm 14, and that the connector bearing 17 will oscillate between limits within the piston 12 on the tracks 24 and 26 during each cycle of the crankshaft rotation.

The maximum piston speed occurs at approximately 50° before and after DTC. 100% of the piston thrust is transmitted into torque at approximately 50° past DTC. In the present heretofore conventional engines, maximum accelerated piston travel and 100% of piston thrust is transmitted into torque at approximately 75° past DTC. It can be shown, strokes being equal, that the subject crankshaft mechanism will provide 40% or more faster piston speed and 40% or more torque from 1° to about 50° of the power stroke than that of the present engines.

Again, it is pointed out, from 1° to about 50° past DTC, which is sufficient range for expending effective pressures, that the shorter rod action made possible through the subject crankshaft mechanism, will provide about 40% or more torque than that of present engines with conventionally longer rods.

Perhaps some of the advantages of the present crankshaft mechanism can be better understood if it is realized that in a one cylinder engine utilizing approximately a 2½ inch stroke, for example, the heretofore conventional structure requires a minimum connecting rod length of approximately 4 inches. With the present invention, the effective comparable rod length can be much less than the stroke, as for example, only 1⁷⁄₁₆ inches.

I claim as my invention:

1. In an internal combustion engine:
   (a) a cylinder,
   (b) a piston reciprocatively mounted in the cylinder,
   (c) a crankshaft including a crankarm,
   (d) a crankarm bearing oscillatively mounted to the crankarm,
   (e) an arcuate connector bearing, having an external bearing surface, integral with the crankarm bearing,
   (f) the center axes of the connector bearing and the crankarm bearing are eccentric, the distance between the center axes of the connector bearing and the crankarm bearing determining the length of a comparable effective connecting rod,
   (g) the distance between the center axes of the connector bearing and the crankarm bearing being greater than the distance between the center axes of the crankarm bearing and the crankshaft,
   (h) the center axis of the connector bearing being located between the center axis of the crankarm bearing and the top of the piston at all times during rotation of the crankshaft, and
   (i) means operatively mounting the external bearing surface of the connector bearing to the piston for oscillative movement.

3. An internal combustion engine as defined in claim 1, in which:
   (j) the crankarm of the crankshaft includes a pair of spaced arms,
   (k) the crankarm bearing extends from opposite sides of the integral connector bearing and includes relatively outwardly facing bearing portions, the connector bearing and integral crankarm bearing being located between the spaced arms of the crankarm, and
   (l) the bearing portions of the crankarm bearing are oscillatively mounted in the spaced arms.

2. An internal combustion engine as defined in claim 1, in which:
   (j) the crankarm of the crankshaft includes a pair of spaced arms,
   (k) the external bearing surface of the connector bearing is circular,
   (l) the crankarm bearing extends from opposite sides of the integral connector bearing, and then extends in the same generally radial direction from the center axis of the connector bearing, and includes relatively outwardly facing bearing portions,
(m) the connector bearing and the integral crankarm bearing are located between the spaced arms of the crankarm,
(n) the bearing portions of the crankarm bearing are oscillatively mounted in the spaced arms, and
(o) the last said means includes a circular mounting inside the piston in which the circular external bearing surface of the connector bearing is oscillatively mounted.

4. An internal combustion engine as defined in claim 1, in which:
(j) the last said means includes an arcuate track internally of the piston on which the external bearing surface of the connector bearing is oscillatively mounted.

5. An internal combustion engine as defined in claim 1, in which:
(j) the crankarm includes a pair of spaced arms,
(k) the crankarm bearing includes integral extension portions extending from opposite sides of the connector bearing and extending in the same generally radial direction from the center axis of the connector bearing, the extension portions having spaced ends, and the crankarm bearing includes relatively outwardly facing bearing portions on the ends oscillatively mounted in the spaced arms of the crankarm.

6. An internal combustion engine as defined in claim 1, in which:
(j) the cylinder is partially recessed to receive the crankarm of the crankshaft,
(k) the crankarm includes a pair of spaced arms,
(l) the last said means includes an arcuate mounting inside the piston in which the external bearing surface of the arcuate connector bearing is oscillatively mounted, and
(m) the crankarm bearing includes integral extension portions extending from opposite sides of the connector bearing and extending in the same generally radial direction from the connector bearing, and includes external bearing portions on the extensive portions facing relatively outwardly from each other, the crankarm bearing portions being oscillatively mounted in the spaced arms of the crankarm while the connector bearing and the integral crankarm extension portions are located between the arms.

7. An internal combustion engine as defined in claim 6, in which:
(n) the cylinder and the piston are recessed on opposite sides to pass the arms of the crankarm and the extension portions of the crankarm bearing upon crankshaft rotation.

References Cited

UNITED STATES PATENTS

| 706,638 | 8/1902 | Clough | 123—197 |
| 1,280,058 | 9/1918 | Martin | 123—197 |

FOREIGN PATENTS

| 15,152 | 1894 | Great Britain. |

WENDELL E. BURNS, Primary Examiner

U.S. Cl. X.R.

74—25, 49